(12) United States Patent
Leggette et al.

(10) Patent No.: US 10,951,358 B2
(45) Date of Patent: Mar. 16, 2021

(54) USING SLICE ROUTERS FOR IMPROVED STORAGE PLACEMENT DETERMINATION

(71) Applicant: International Business Machines Corporation, Armonk, NY (US)

(72) Inventors: Wesley B. Leggette, Chicago, IL (US); Manish Motwani, Chicago, IL (US); Brian F. Ober, Lake in the Hills, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/380,383

(22) Filed: Apr. 10, 2019

(65) Prior Publication Data

US 2019/0238267 A1   Aug. 1, 2019

Related U.S. Application Data

(63) Continuation of application No. 15/624,771, filed on Jun. 16, 2017, now Pat. No. 10,361,813.

(51) Int. Cl.
*H04L 1/00* (2006.01)
*H04L 29/08* (2006.01)
*G06F 11/10* (2006.01)

(52) U.S. Cl.
CPC ........ *H04L 1/0057* (2013.01); *G06F 11/1016* (2013.01); *G06F 11/1076* (2013.01);
(Continued)

(58) Field of Classification Search
CPC . H04L 1/0057; H04L 1/0041; H04L 67/1097; H04L 1/0076; G06F 11/1016; G06F 11/1076
See application file for complete search history.

(56) References Cited

U.S. PATENT DOCUMENTS 4,092,732 A   5/1978   Ouchi
5,454,101 A   9/1995   Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Kyle Vallecillo
(74) *Attorney, Agent, or Firm* — James Nock; Andrew D. Wright; Roberts Calderon Safran & Cole. P.C.

(57) ABSTRACT

A method begins by a dispersed storage (DS) processing unit of a dispersed storage network (DSN) sending a set of data access requests regarding a set of encoded data slices to slice routers of the DSN. The method continues by a first slice router identifying a first storage unit of a first storage unit group based on a first slice name of a set of corresponding slice names that includes a first pillar number, wherein the first slice router is responsible for processing access requests that include the first pillar number. The method continues by the first slice router sending a first data access request of the set of data access requests to the first storage unit. The method continues by the first slice router receiving a first data access response. The method continues by the first slice router forwarding the first data access response to the DS processing unit.

14 Claims, 9 Drawing Sheets

(52) U.S. Cl.
CPC .......... *H04L 1/0041* (2013.01); *H04L 1/0076* (2013.01); *H04L 67/1097* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 10,361,813 | B2 | 7/2019 | Leggette et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0250519 | A1 | 10/2007 | Fineberg et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0306524 | A1 | 12/2010 | Runkis et al. |
| 2011/0022642 | A1 | 1/2011 | deMilo et al. |
| 2011/0106972 | A1* | 5/2011 | Grube ................. G06F 12/1009 709/238 |
| 2011/0289122 | A1* | 11/2011 | Grube ................. G06F 11/2094 707/812 |
| 2012/0089885 | A1 | 4/2012 | Grube et al. |
| 2012/0110346 | A1 | 5/2012 | Resch |
| 2012/0117351 | A1 | 5/2012 | Motwani et al. |
| 2013/0170062 | A1* | 7/2013 | Gladwin ............. G11B 20/1252 360/49 |
| 2013/0325820 | A1 | 12/2013 | Grube et al. |
| 2014/0019579 | A1 | 1/2014 | Motwani et al. |
| 2014/0281066 | A1 | 9/2014 | Grube et al. |
| 2014/0325264 | A1* | 10/2014 | Gladwin ............. G06F 11/1096 714/6.22 |
| 2014/0325266 | A1* | 10/2014 | Hoffman ............ G06F 11/2094 714/6.32 |
| 2014/0325307 | A1* | 10/2014 | Resch ................. G06F 11/1076 714/763 |
| 2016/0350329 | A1 | 12/2016 | Resch et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

List of IBM Patents or Patent Applications Treated as Related, dated Oct. 13, 2020, 1 page.

\* cited by examiner

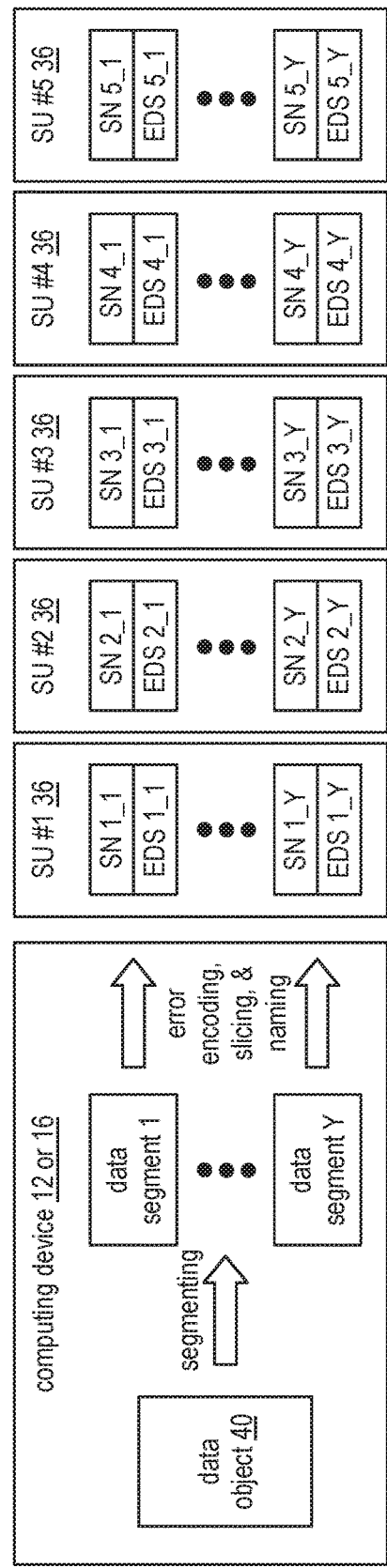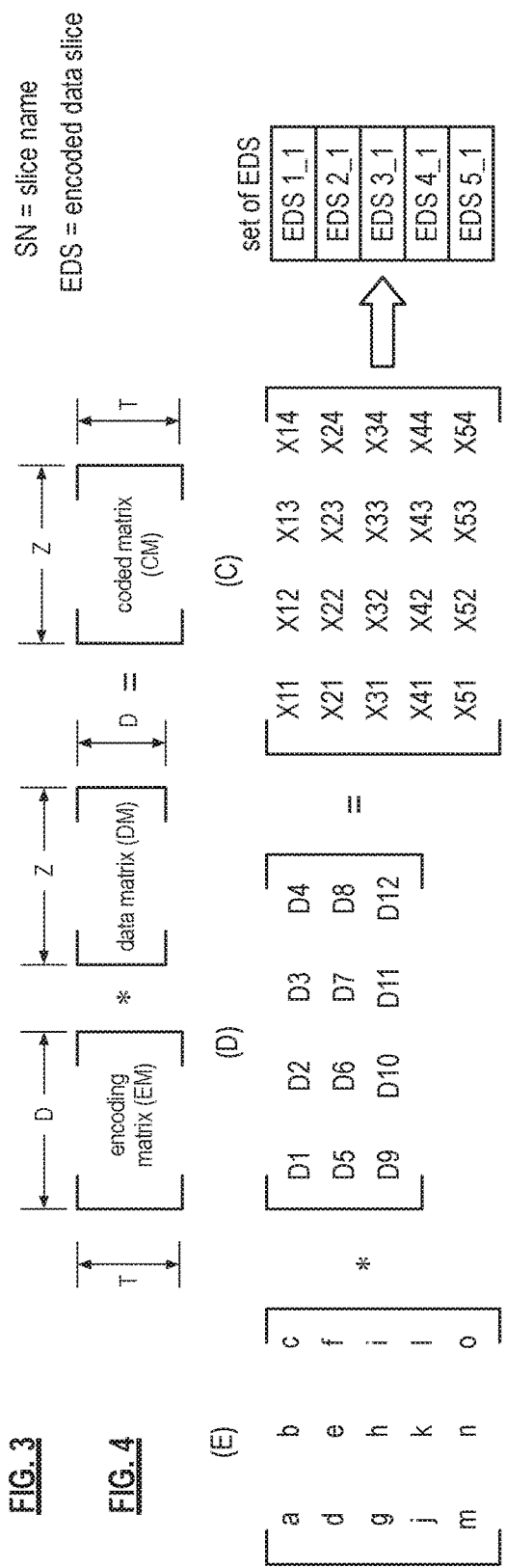
FIG. 3
FIG. 4
FIG. 5
FIG. 6

USING SLICE ROUTERS FOR IMPROVED STORAGE PLACEMENT DETERMINATION

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
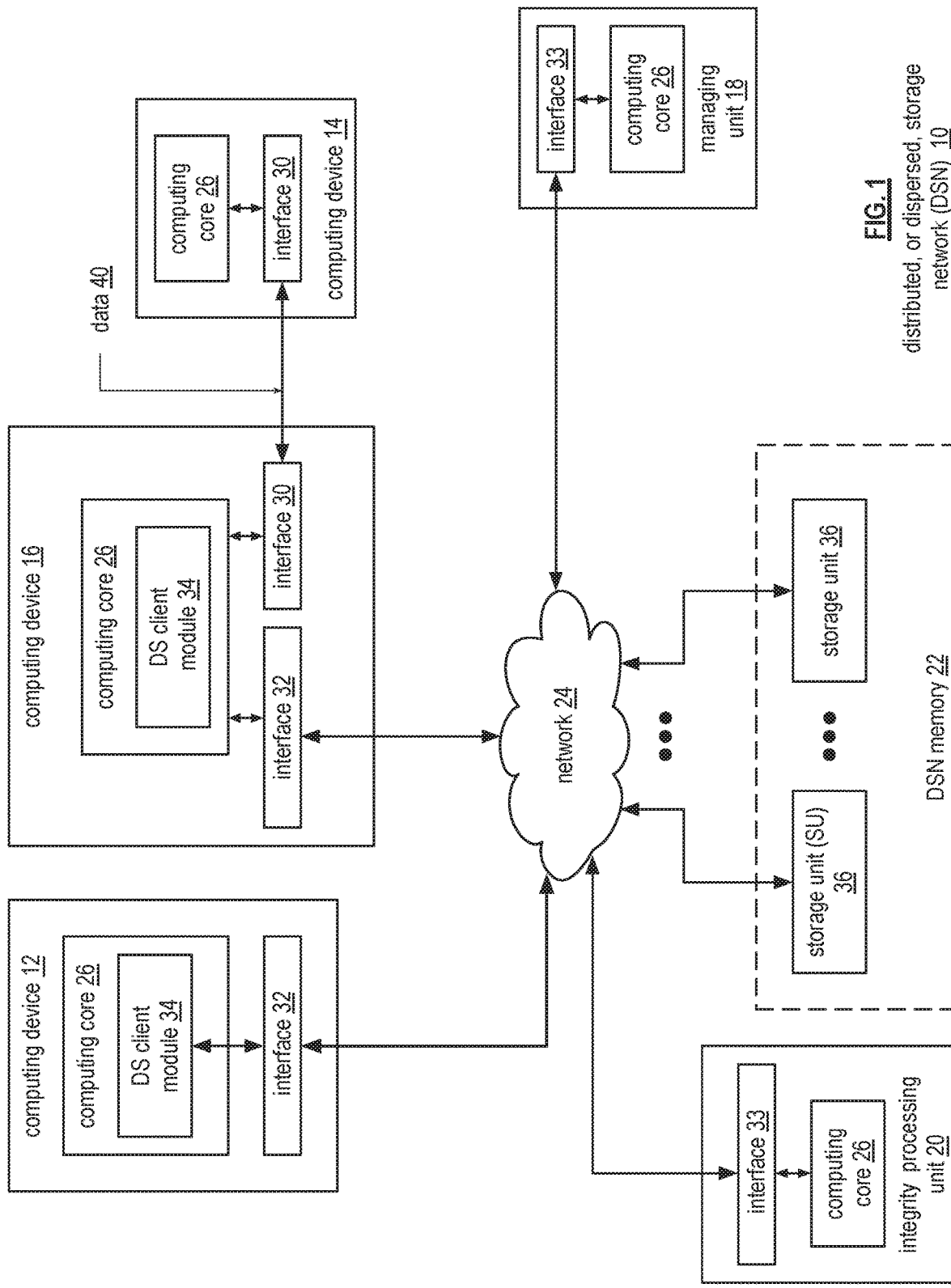
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
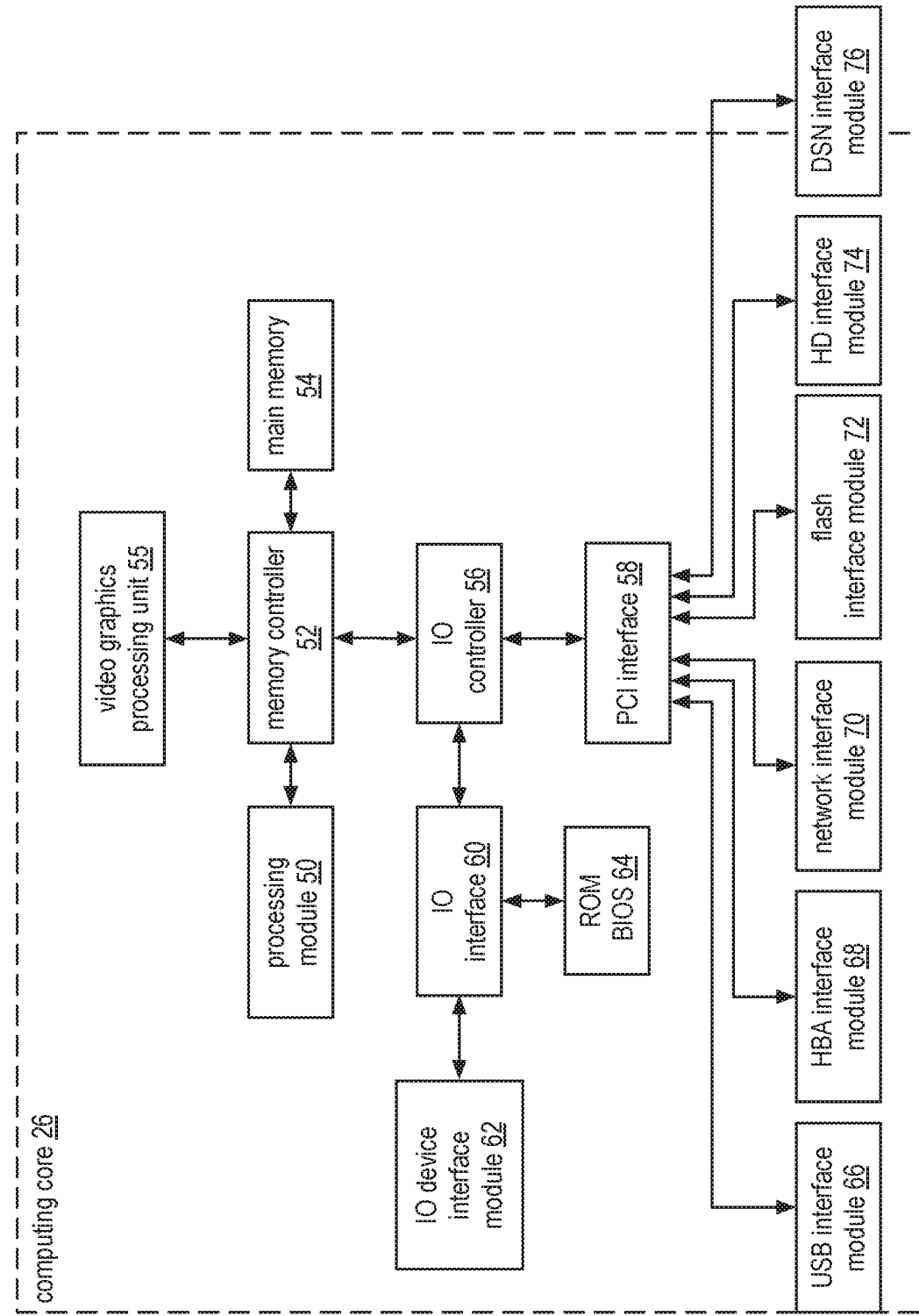
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
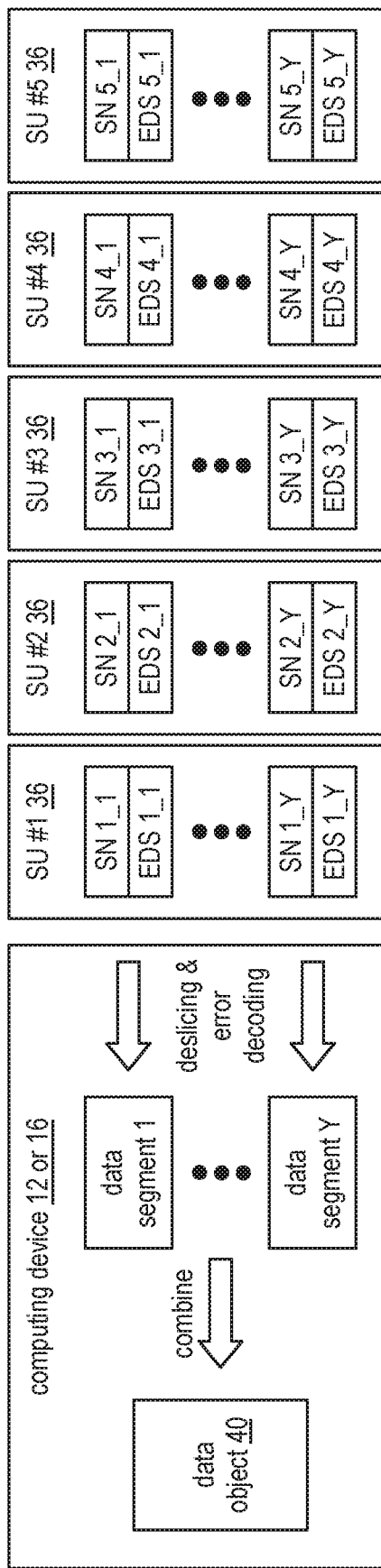
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
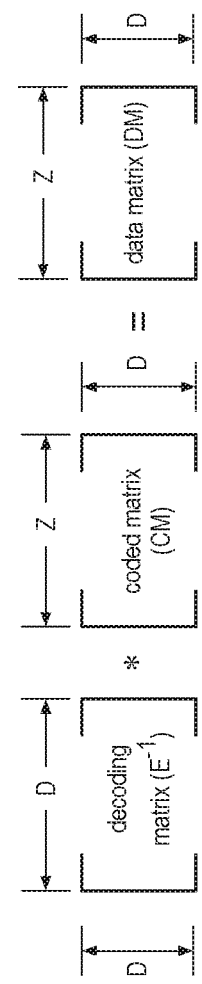
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
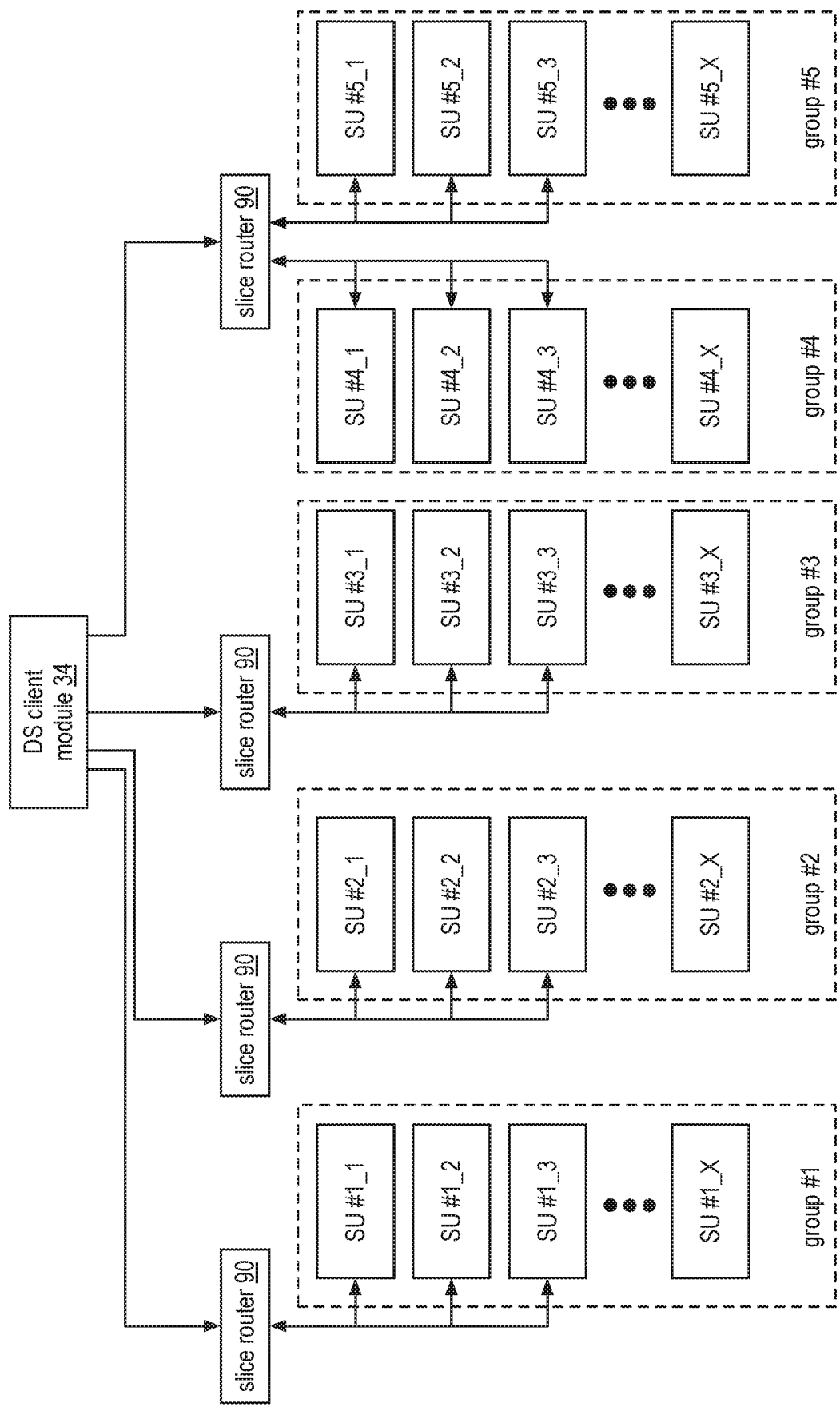
FIG. 9 is a schematic block diagram of another embodiment of a dispersed storage network (DSN) in accordance with the present invention.

FIG. 9 is a schematic block diagram of another embodiment of a dispersed storage network (DSN) that includes a DS client module 34, slice routers and storage unit groups 1-5. Each of the storage groups includes a plurality of storage units and corresponds to a pillar number. For example, storage unit group 1 includes storage unit SU #1_1 through SU #1_X; storage unit group 2 includes storage unit SU #2_1 through SU #2_X; storage unit group 3 includes storage unit SU #3_1 through SU #3_X, and so on. This example includes four slice routers: one for each of storage unit groups 1, 2, and 3 and a fourth for storage unit groups 4 and 5. Note that more or less slice routers may be used in a DSN.

In an example of operation, a set of encoded data slices are stored (e.g., for a read request) or to be stored (e.g., for a write request) in storage units of a set of storage unit groups in accordance with a set of corresponding slice names. A dispersed storage (DS) processing unit (e.g., DS client module 34) sends a set of data access requests regarding the set of encoded data slices to slice routers 90.

A first slice router 90 (e.g., group #1 slice router 90) receives a data access request of the set of data access requests and identifies a first storage unit (e.g., SU #1_1) of group #1 based on a first slice name of the set of corresponding slice names. Note the DS client module works at a DSN level logical address space and the slice routers work at a storage unit logical address space. The DSN level and storage unit level logical address spaces are discussed in further detail in FIGS. 10A and 10B.

Having identified the storage unit, the first slice router 90 sends the data access request to the first storage unit. For example, the first slice router sends a read request to the first storage unit. The first slice router then receives a first data access response from the first storage unit. For example, the first slice router receives a read response to the first storage unit. Having received the data access response from the first storage unit, the first slice router forwards the data access response to the DS processing unit.

A dispersed storage network (DSN) may have numerous storage units in operation, as such, a DS client module 34 may generally need numerous connections to interact with each storage unit to process data access requests. By using slice routers 90 in the DSN, the DS client module may offload a portion of its processing to the slice routers. As an example, without slice routers 90, when X=32 (e.g., each group in FIG. 9 has 32 storage units), the DS client module would need to know addressing information for each of the 160 storage units. In this example and with the use of slice routers 90, the DS client module only needs to know addressing information for four slice routers 90.

Each slice router 90 includes processing to render storage decisions for received encoded data slices. For example, a slice router receives an encoded data slice with its corresponding slice name. The slice name represents the DSN level logical address of the encoded data slice. The slice router interprets the slice name to identify a storage unit in its group. If the identified storage unit is an appropriate storage location, the slice router sends the encoded data slice to the identified storage unit for storage therein. If, however, the slice router determines that the identified storage unit is not an appropriate storage location (e.g., it is too slow, it is almost full, it is experiencing too many failures, etc. and there is another storage unit that is more appropriate), the slice router will create a new slice name for the slice such that is goes to a different storage unit in its group. The slice router records the slice name translation for subsequent DSN level processing.

Figure 10B:
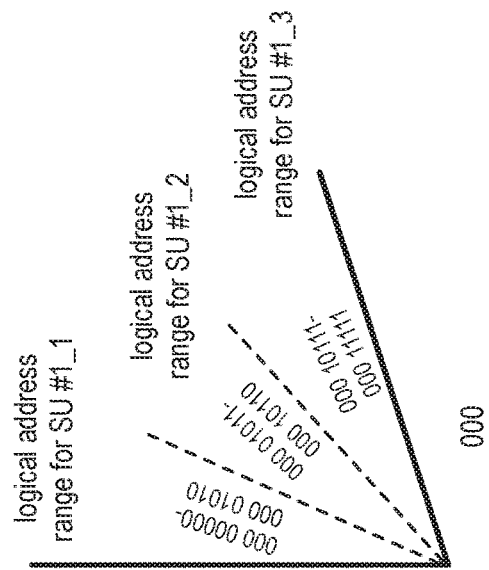
FIG. 10B is a schematic block diagram of a DSN address range for a group of storage units in accordance with the present invention.
Figure 10A:
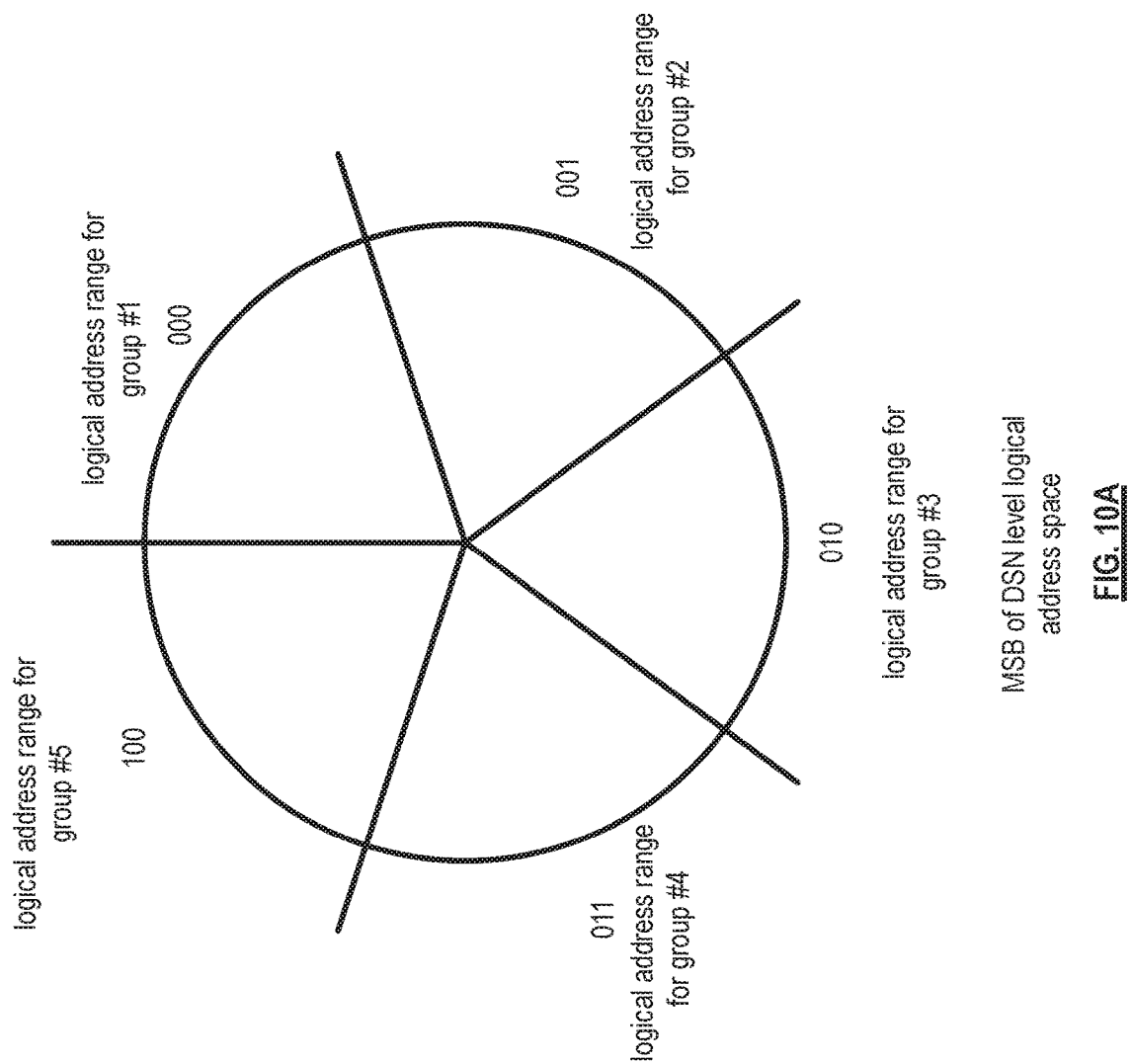
FIG. 10A is a schematic block diagram of a DSN address range for a DSN in accordance with the present invention.

FIG. 10A is a schematic block diagram of most significant bits (MSB) of a dispersed storage network (DSN) logical address space. Each MSB section corresponds to a pillar number of a set of encoded data slices. In this example, there are five pillars. MSB 000 corresponds to pillar #1 and storage group #1; MSB 001 corresponds to pillar #2 and storage group #2; MSB 010 corresponds to pillar #3 and storage group #3; MSB 011 corresponds to pillar #4 and storage group #4; and MSB 000 corresponds to pillar #5 and storage group #5.

FIG. 10B is a schematic block diagram of the MSB 000 section of the DSN address space divided into three sections of 000 0000-000 01010, 000 01011-000 10110, and 000 10111-000 11111. Each section is for more or more storage units. As an example, a first storage unit (e.g., SU #1_1) of group 1 is allocated a logical address range of 000 0000-000 01010, a second storage unit of group 1 is allocated a logical address range of 000 01011-000 10110, and a third storage unit is allocation a logical address range of 000 10111-000 11111. Note that the slice router maintains and adjusts, as needed, the logical address mapping to storage units in its group. Further note that the slice name, which corresponds to a DSN logical address, may include many more bits that shown in the present example.

In an example of operation, the DS client module partitions a DSN level logical address range amongst 5 storage groups. A first slice router 90 then partitions a corresponding group level logical address range between 3 storage units. When the DS client module determines to send a group of data access requests, it only needs to know that for a logical address range beginning with 000, it sends those data access requests to the first slice router 90. The first slice router 90 then determines which storage unit to forward each of the data access requests based on at least some of the remainder of the logical address range (e.g., by reading the slice name). For example, for a data access request with the logical address 000 00001, the slice router 90 identifies a first storage unit (e.g., SU #1_1). As another example, for a data request with the logical address 000 11001, the first slice router 90 identifies a third storage unit (e.g., SU #1_3).

In this example, the DS client module operates at DSN level logical addresses (e.g., FIG. 10A) and communicate with one or more slice routers. The slice routers operate at storage unit logical levels (e.g., FIG. 10B) and communicate with one or more groups of storage units. In a large system, offloading DS client module processing to slice routers enables more efficient communication for a variety of data access requests and better storage utilization of the groups of storage units.

Figure 11:
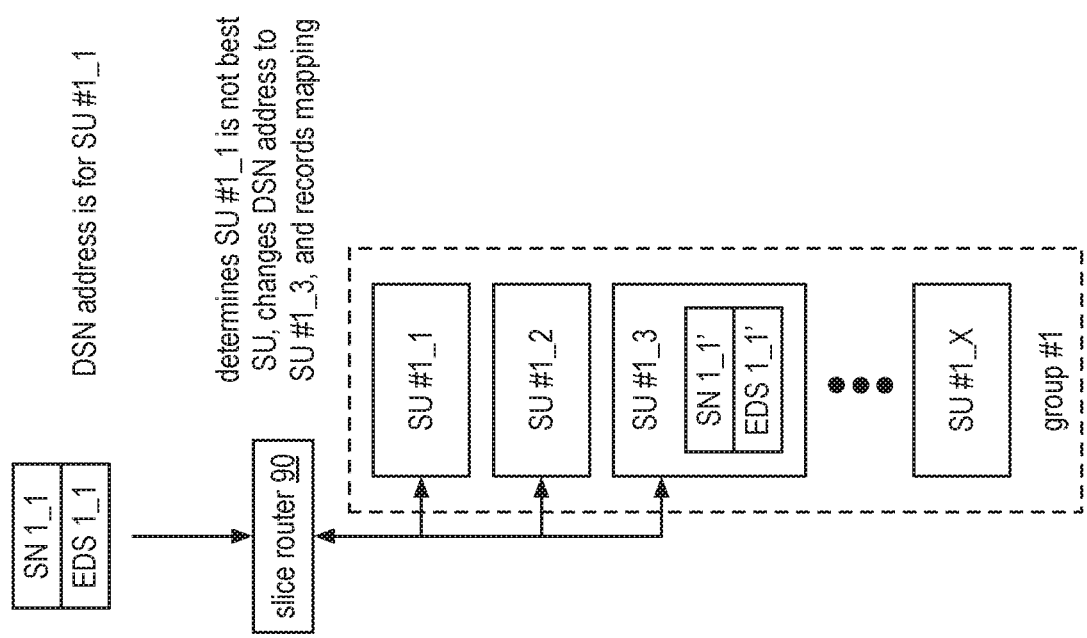
FIG. 11 is an example of DSN address mapping by a slice router in accordance with the present invention.

FIG. 11 is an example of DSN address mapping by a slice router. From time to time, memory imbalances may occur within a group of storage units (e.g., storage units 1-2 storing more data than storage unit 3). In an example, the slice router 90 receives a write request that includes encoded data slice EDS 1_1 and slice name SN 1_1 from a DS client module 34 and determines a DSN address based on the slice name. The slice router 90 then accesses a DSN logical address to storage unit mapping to identify storage unit #1_1.

The slice router then determines storage attributes (e.g., storage capacity, cost per storage operation, availability level, etc.) of storage unit #1_1 and compares the storage attributes to a storage attribute threshold. When storage unit #1_1's storage attributes compare unfavorably to the storage attribute threshold, the slice router determines storage attributes of another storage unit (e.g., storage unit #1_3). When storage unit #1_3's storage attributes compare favorably to the storage attribute threshold, the slice router converts the DSN address into another DSN address that maps to storage unit #1_3. The slicer router then sends the write request to storage unit #1_3 for storage therein and records the converted DSN address in the DSN logical address to storage unit mapping.

Figure 12:
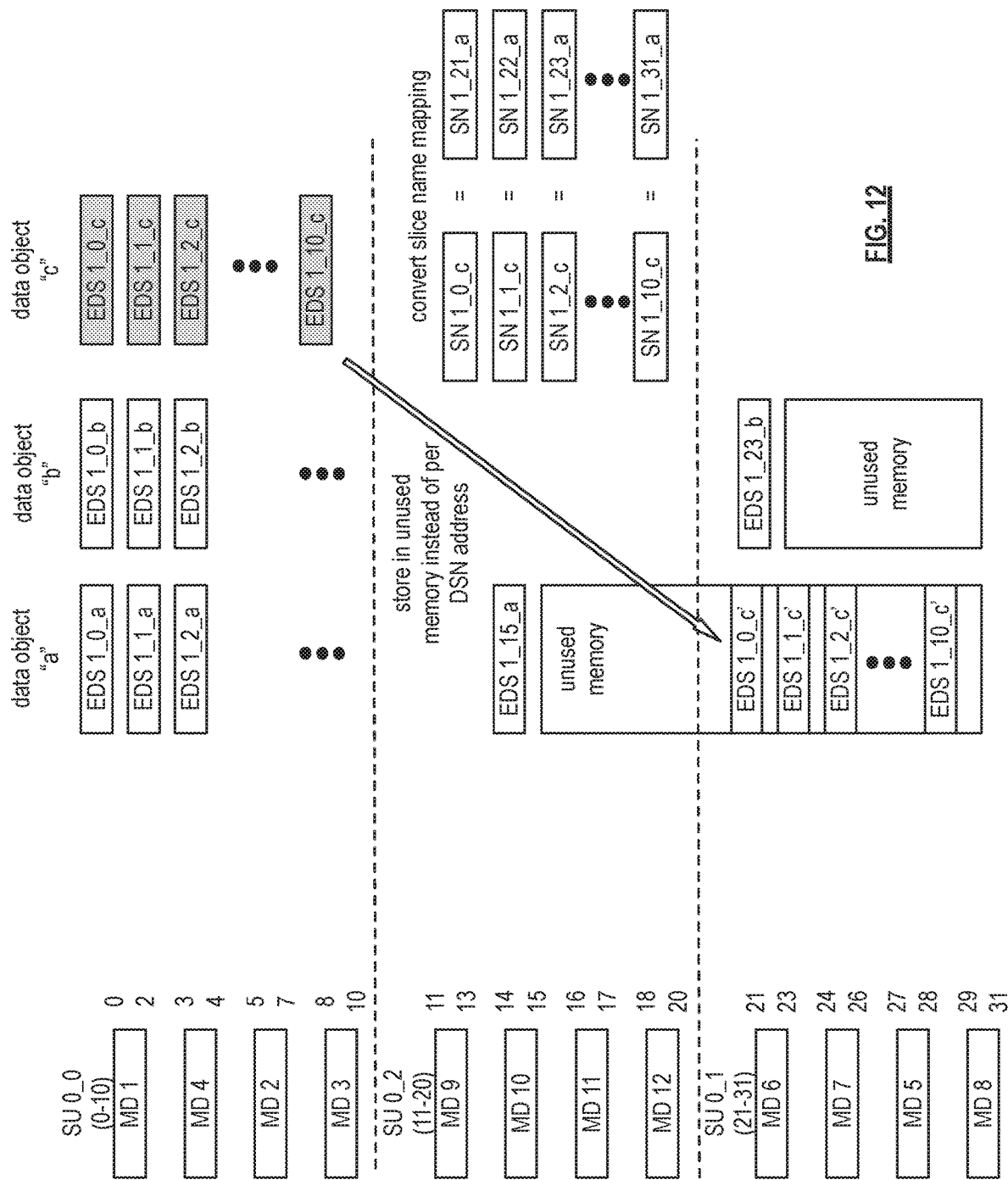
FIG. 12 is another example of DSN address mapping by a slice router in accordance with the present invention.

FIG. 12 is another example of DSN address mapping by a slice router. As illustrated, a group of storage units includes three storage units (e.g., SU 0_0, SU 0_2, and SU 0_1). Each storage unit includes four memory devices (MDs). For example, storage unit 0_0 includes memory devices 1-4. In this example, the group of storage units are operable to store up to 32 segments per region for any given data object. A slice router associated with the group of storage units partitions a DSN group level logical address range between the storage units. For example, memory device (MD) 1 is assigned segments 1-3 (storage unit address range with least significant bits 0-2), MD 4 is assigned segments 4-5 (storage unit address range 3-4), etc. After storing encoded data slices associated with data objects of different sizes (e.g., data objects a and b) in the storage units, a portion of memory may be unused. For example, when storing encoded data slices (e.g., EDS 1_0_a through EDS 1_15_a) for data object "a" and encoded data slice EDS 1_0_b through EDS 1_23_b for data object "b", memory available for segments 16-31 for object "a" and 24-31 for object "b" are unused.

When the slice router 90 receives encoded data slices (e.g., EDS 1_0_c through EDS 1_10_c) for data object "c" for storage, it accesses a DSN logical addressing to storage unit mapping to identify storage unit 0_0. The slice router then determines storage attributes of SU 0_0. When the storage attributes of SU 0_0 compare unfavorably to a storage attribute threshold, the slice router identifies one or more unused DSN address ranges of the storage unit group. The slice router then determines that physical addresses of storage unit 0_1 are mapped to at least some logical addresses of the unused DSN address range to identify storage unit 0_1. The slice router then converts slice names SN 1_0_c through SN 1_10_c for encoded data slices EDS 1_0_c through EDS 1_10_c to slice names SN 1_21_a through SN 1_31_a that maps the encoded data slices EDS 1_0_c through EDS 1_10_c to the unused DSN address range of storage unit 0_1. The slice router then sends encoded data slices EDS 1_0_c through EDS 1_10_c to storage unit 0_1 for storage.

Figure 13:
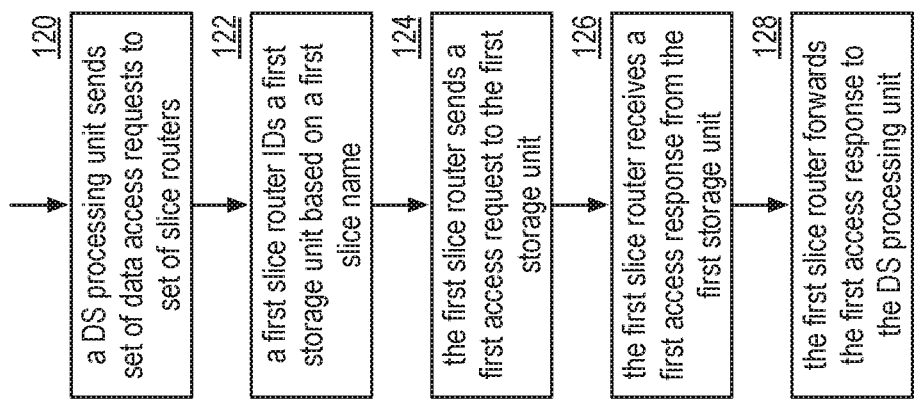
FIG. 13 is a logic flow diagram of a method of using slice routers for improved storage placement in accordance with the present invention.

FIG. 13 is a logic flow diagram of a method of using slice routers for improved storage placement. The method begins with step 120, where a dispersed storage (DS) processing unit of a dispersed storage network (DSN) sends a set of data access requests regarding a set of encoded data slices to a set of slice routers of the DSN. Note the set of encoded data slices is stored, or to be stored, in storage units of a set of storage unit groups in accordance with a set of corresponding slice names.

The method continues with step 122, where a first slice router of the set of slice routers identifies a first storage unit from a first plurality of storage units of a first storage unit group of the set of storage unit groups based on a first slice name of the set of corresponding slice names. Note the first storage unit is one of the storage units of the set of storage unit groups.

As an example of identifying the first storage unit, the slice router determines a DSN address based on the first slice name, then, having determined the DSN address, accesses a DSN logical addressing to storage unit mapping that identifies the first storage unit based on the DSN address.

Each slice router may be operable to communicate with one or more storage unit groups. For example, a second slice router of the set of slice routers identifies a second storage unit from a second plurality of storage units of a second storage unit group of the set of storage unit groups based on a second slice name of the set of corresponding slice names. As another example, the first slice router identifies the second storage unit from the second plurality of storage units of the second storage unit group of the set of storage unit groups based on the second slice name of the set of corresponding slice names.

As a further example of identifying the first storage unit, the slice router determines a DSN address based on the first slice name and accesses a DSN logical address to storage unit mapping to identify a second storage unit of the first plurality of storage units. The slice router then determines second storage attributes of the second storage unit. The storage attributes may include one or more of storage capacity, storage utilization, cost per storage over time, cost per storage operation, performance capacity, reliability level, availability level and fault domain.

The slice router then compares the second storage attributes to a storage attribute threshold. When the second storage attributes compare unfavorably to a storage attribute threshold, the slice router determines first storage attributes of the first storage unit. When the first storage attributes compare favorably to the storage attribute threshold, the slice router converts the DSN address into another DSN address that maps to the first storage unit.

In a still further example of identifying the first storage unit, the slice router determines a DSN address based on the first slice name and accesses a DSN logical address to storage unit mapping to identify a second storage unit of the first plurality of storage units. The slice router then determines second storage attributes of the second storage unit. The slice router then compares the second storage attributes to a storage attribute threshold. When the second storage attributes compare unfavorably to a storage attribute threshold, the slice router identifies an unused DSN address range in the first storage unit group and determines that physical addresses of the first storage unit are mapped to at least some logical addresses of the unused DSN address range to identify the first storage unit.

The method continues with step 124, where the first slice router sends a first data access request of the set of data access requests to the first storage unit. The method continues with step 126, where the first slice router receives a first data access response from the first storage unit. The method continues with step 128, where the first slice router forwards the first data access request to the DS processing unit.

It is noted that terminologies as may be used herein such as bit stream, stream, signal sequence, etc. (or their equivalents) have been used interchangeably to describe digital information whose content corresponds to any of several desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    sending, by a dispersed storage (DS) processing unit of a dispersed storage network (DSN), a set of data access requests regarding a set of encoded data slices to a set of slice routers of the DSN, wherein the set of encoded data slices is stored, or to be stored, in storage units of a set of storage unit groups of the DSN in accordance with a set of corresponding slice names, wherein a data segment of data is dispersed storage error encoded into the set of encoded data slices in accordance with dispersed data storage parameters that include a pillar width total number and a decode threshold number, and wherein a first storage unit group of the set of storage unit groups is associated with a first pillar number of the pillar width total number;
    identifying, by a first slice router of the set of slice routers, a first storage unit from a first plurality of storage units of the first storage unit group of the set of storage unit groups based on a first slice name of the set of corresponding slice names, wherein the first slice name includes the first pillar number, wherein the first storage unit is one of the storage units of the set of storage unit groups, and wherein the first slice router is responsible for processing data access requests of the set of data access requests that include the first pillar number;
    sending, by the first slice router, a first data access request of the set of data access requests to the first storage unit;
    receiving, by the first slice router, a first data access response from the first storage unit; and
    forwarding, by the first slice router, the first data access response to the DS processing unit.

2. The method of claim 1 further comprises:
    identifying, by a second slice router of the set of slice routers, a second storage unit from a second plurality of storage units of a second storage unit group of the set of storage unit groups based on a second slice name of the set of corresponding slice names, wherein the second slice name includes a second pillar number of the pillar width total number, wherein the second storage unit group is associated with the second pillar number, wherein the second storage unit is another one of the storage units of the set of storage unit groups, and wherein the second slice router is responsible for processing data access requests of the set of data access requests that include the second pillar number;
    sending, by the second slice router, a second data access request of the set of data access requests to the second storage unit;
    receiving, by the second slice router, a second data access response from the second storage unit; and
    forwarding, by the second slice router, the second data access response to the DS processing unit.

3. The method of claim 1 further comprises:
    identifying, by the first slice router, a second storage unit from a second plurality of storage units of a second storage unit group of the set of storage unit groups based on a second slice name of the set of corresponding slice names, wherein the second slice name includes a second pillar number of the pillar width total number, wherein the second storage unit is another one of the storage units of the set of storage unit groups, and wherein the first slice router is responsible for processing data access requests of the set of data access requests that include the second pillar number;
    sending, by the first slice router, a second data access request of the set of data access requests to the second storage unit;
    receiving, by the first slice router, a second data access response from the second storage unit; and
    forwarding, by the first slice router, the second data access response to the DS processing unit.

4. The method of claim 1, wherein the identifying the first storage unit comprises:
    determining a DSN address based on the first slice name; and
    accessing a DSN logical addressing to storage unit mapping to identify the first storage unit based on the DSN address.

5. The method of claim 1, wherein the identifying the first storage unit comprises:
    determining a DSN address based on the first slice name;
    accessing a DSN logical addressing to storage unit mapping to identify a second storage unit of the first plurality of storage units based on the DSN address;
    determining second storage attributes of the second storage unit; and
    when the second storage attributes compare unfavorably to a storage attribute threshold:
        determining first storage attributes of the first storage unit; and
        when the first storage attributes compare favorably to the storage attribute threshold, converting the DSN address into another DSN address that maps to the first storage unit.

6. The method of claim 5, wherein the first and second storage attributes comprise one or more of:
    storage capacity;
    storage utilization;
    cost per storage over time;
    cost per storage operation;
    performance capacity;
    reliability level;
    availability level; and
    fault domain.

7. The method of claim 1, wherein the identifying the first storage unit comprises:
    determining a DSN address based on the first slice name;
    accessing a DSN logical addressing to storage unit mapping to identify a second storage unit of the first plurality of storage units based on the DSN address;
    determining second storage attributes of the second storage unit; and
    when the second storage attributes compare unfavorably to a storage attribute threshold:
        identifying an unused DSN address range in the first storage unit group; and
        determining that physical addresses of the first storage unit are mapped to at least some logical addresses of the unused DSN address range to identify the first storage unit.

8. A non-transitory computer readable memory device comprises:
    a first memory section for storing operational instructions that, when executed by a dispersed storage (DS) processing unit of a dispersed storage network (DSN), causes the DS processing unit to:

send a set of data access requests regarding a set of encoded data slices to a set of slice routers of the DSN, wherein the set of encoded data slices is stored, or to be stored, in storage units of a set of storage unit groups of the DSN in accordance with a set of corresponding slice names, wherein a data segment of data is dispersed storage error encoded into the set of encoded data slices in accordance with dispersed data storage parameters that include a pillar width total number and a decode threshold number, and wherein a first storage unit group of the set of storage unit groups is associated with a first pillar number of the pillar width total number;

a second memory section for storing operational instructions that, when executed by a first slice router of the set of slice routers, causes the first slice router to:

identify a first storage unit from a first plurality of storage units of the first storage unit group of the set of storage unit groups based on a first slice name of the set of corresponding slice names, wherein the first slice name includes the first pillar number, wherein the first storage unit is one of the storage units of the set of storage unit groups, and wherein the first slice router is responsible for processing data access requests of the set of data access requests that include the first pillar number;

send a first data access request of the set of data access requests to the first storage unit;

receive a first data access response from the first storage unit; and forward the first data access response to the DS processing unit.

9. The non-transitory computer readable memory device of claim 8 further comprises:

a third memory section for storing operational instructions that, when executed by a second slice router of the set of slice routers, causes the second slice router to:

identify a second storage unit from a second plurality of storage units of a second storage unit group of the set of storage unit groups based on a second slice name of the set of corresponding slice names, wherein the second slice name includes a second pillar number of the pillar width total number, wherein the second storage unit group is associated with the second pillar number, wherein the second storage unit is another one of the storage units of the set of storage unit groups, and wherein the second slice router is responsible for processing data access requests of the set of data access requests that include the second pillar number;

send a second data access request of the set of data access requests to the second storage unit;

receive a second data access response from the second storage unit; and forward the second data access response to the DS processing unit.

10. The non-transitory computer readable memory device of claim 8 wherein the second memory section stores further operational instructions that, when executed by the first slice router of the set of slice routers, causes the first slice router to:

identify a second storage unit from a second plurality of storage units of a second storage unit group of the set of storage unit groups based on a second slice name of the set of corresponding slice names, wherein the second slice name includes a second pillar number of the pillar width total number, wherein the second storage unit is another one of the storage units of the set of storage unit groups, and wherein the first slice router is responsible for processing data access requests of the set of data access requests that include the second pillar number;

send a second data access request of the set of data access requests to the second storage unit;

receive a second data access response from the second storage unit; and forward the second data access response to the DS processing unit.

11. The non-transitory computer readable memory device of claim 8, wherein the second memory section stores further operational instructions that, when executed by the first slice router, causes the first slice router to identify the first storage unit by:

determining a DSN address based on the first slice name; and accessing a DSN logical addressing to storage unit mapping to identify the first storage unit based on the DSN address.

12. The non-transitory computer readable memory device of claim 8, wherein the second memory section stores further operational instructions that, when executed by the first slice router, causes the first slice router to identify the first storage unit by:

determining a DSN address based on the first slice name;

accessing a DSN logical addressing to storage unit mapping to identify a second storage unit of the first plurality of storage units based on the DSN address; and determining second storage attributes of the second storage unit;

when the second storage attributes compare unfavorably to a storage attribute threshold:

determining first storage attributes of the first storage unit; and when the first storage attributes compare favorably to the storage attribute threshold, converting the DSN address into another DSN address that maps to the first storage unit.

13. The non-transitory computer readable memory device of claim 12, wherein the first and second storage attributes comprise one or more of:

storage capacity;
storage utilization;
cost per storage over time;
cost per storage operation;
performance capacity;
reliability level;
availability level; and
fault domain.

14. The non-transitory computer readable memory device of claim 8, wherein the second memory section stores further operational instructions that, when executed by the first slice router, causes the first slice router to identify the first storage unit by:

determining a DSN address based on the first slice name;

accessing a DSN logical addressing to storage unit mapping to identify a second storage unit of the first plurality of storage units based on the DSN address;

determining second storage attributes of the second storage unit; and when the second storage attributes compare unfavorably to a storage attribute threshold:
   identifying an unused DSN address range in the first storage unit group; and
   determining that physical addresses of the first storage unit are mapped to at least some logical addresses of the unused DSN address range to identify the first storage unit.

* * * * *